US012590005B2

(12) United States Patent
Olbert et al.

(10) Patent No.: US 12,590,005 B2
(45) Date of Patent: Mar. 31, 2026

(54) PROCESS AND REACTOR FOR PRODUCING PHOSGENE

(71) Applicant: BASF SE, Ludwigshafen am Rhein (DE)

(72) Inventors: Gerhard Olbert, Ludwigshafen am Rhein (DE); Jens Ferbitz, Ludwigshafen am Rhein (DE); Kai Thiele, Antwerp (BE); Peter Van Den Abeel, Antwerp (BE); Koenraad Vandewalle, Antwerp (BE); Jim Brandts, De Meern (NL); Torsten Mattke, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 864 days.

(21) Appl. No.: 17/612,237

(22) PCT Filed: Apr. 20, 2020

(86) PCT No.: PCT/EP2020/061002

§ 371 (c)(1),
(2) Date: Nov. 18, 2021

(87) PCT Pub. No.: WO2020/233921

PCT Pub. Date: Nov. 26, 2020

(65) Prior Publication Data

US 2022/0332587 A1 Oct. 20, 2022

(30) Foreign Application Priority Data

May 20, 2019 (EP) .................................... 19175429

(51) Int. Cl.
*C01B 32/80* (2017.01)
*B01J 8/06* (2006.01)

(52) U.S. Cl.
CPC .............. *C01B 32/80* (2017.08); *B01J 8/065* (2013.01); *B01J 8/067* (2013.01); *B01J 2208/065* (2013.01)

(58) Field of Classification Search
CPC ..... C01B 32/80; B01J 2208/065; B01J 8/065; B01J 8/067; B01J 8/06
See application file for complete search history.

(56) References Cited

U.S. PATENT DOCUMENTS

2005/0118088 A1* 6/2005 Olbert .................... B01J 12/007
422/600
2013/0072717 A1* 3/2013 Olbert ................. B01J 19/0053
562/847

FOREIGN PATENT DOCUMENTS

| EP | 0998973 A1 | 5/2000 |
|---|---|---|
| WO | 03/72237 A1 | 9/2003 |
| WO | 2010/076208 A1 | 7/2010 |
| WO | 2010/103029 A1 | 9/2010 |
| WO | WO2012132031 | * 10/2012 |

OTHER PUBLICATIONS

WO2012132031 Translation (Year: 2012).*
William Luyben (Design of Cooled Tubular Reactor Systems, Ind. Eng. Chem. Res. , Published Oct. 2012) (Year: 2012).*
International Search Report and Written Opinion received for PCT Patent Application No. PCT/EP2020/061002, mailed on Jul. 24, 2020, 18 pages (8 pages of English Translation and 10 pages of Original Document).
Christopher, et al., "Selection of carbon catalysts for the industrial manufacture of phosgene", Catal. Sci. Technol, vol. 2, 2012, pp. 2109-2115.
European Search Report for EP Patent Application No. 19175429.0, Issued on Nov. 14, 2019, 3 pages.
International Preliminary Report on Patentability received for PCT Patent Application No. PCT/EP2020/061002, mailed on Dec. 2, 2021, 15 pages (8 pages of English Translation and 7 pages of Original Document).

* cited by examiner

*Primary Examiner* — Andrew D Kosar
*Assistant Examiner* — Blaine G Doletski
(74) *Attorney, Agent, or Firm* — Faegre Drinker Biddle & Reath LLP

(57) ABSTRACT

The invention relates to a process for producing phosgene by gas-phase reaction of carbon monoxide and chlorine in the presence of a catalyst in a reactor which comprises a plurality of parallel catalyst tubes which are filled with the catalyst and around which at least one fluid heat transfer medium flows, where a feed stream of a mixture of a chlorine input stream and a carbon monoxide input stream is fed into the catalyst tubes and is allowed to react to give a phosgene-comprising product gas mixture, wherein the reaction is carried out at an area load of more than 2.75 kg of phosgene/m2s. The invention also provides a reactor for carrying out the process.

8 Claims, 3 Drawing Sheets

PROCESS AND REACTOR FOR PRODUCING PHOSGENE

CROSS-REFERENCE TO RELATED APPLICATIONS

This application is a national stage application (under 35 U.S.C. § 371) of PCT/EP2020/061002, filed Apr. 20, 2020, which claims benefit of European Application No. 19175429.0, filed May 20, 2019, both of which are incorporated herein by reference in their entirety.

The invention relates to a process and a reactor for producing phosgene by gas-phase reaction of carbon monoxide and chlorine in the presence of a catalyst, in particular in the presence of an activated carbon catalyst.

Phosgene is an important auxiliary in the production of intermediates and end products in virtually all branches of chemistry. In particular, phosgene is a widespread reagent for industrial carbonylation, for example in the production of isocyanates or organic acid chlorides. The largest field of use in terms of amount is the production of diisocyanates for polyurethane chemistry, in particular tolylene diisocyanate or diphenylmethane 4,4-diisocyanate.

Phosgene is produced industrially in a catalytic gas-phase reaction of carbon monoxide and chlorine in the presence of a catalyst, for example an activated carbon catalyst, according to the reaction equation:

$$CO + Cl_2 \leftrightarrows COCl_2.$$

The reaction is strongly exothermic with an enthalpy of reaction $\Delta H$ of $-107.6$ kJ/mol. The reaction is usually carried out in a shell-and-tube reactor by the process described in Ullmann's Encyclopedia of Industrial Chemistry in the chapter "Phosgene" (5th Ed. Vol. A 19, p 413 ff., VCH Verlagsgesellschaft mbH, Weinheim, 1991). In this process, a particulate catalyst having a particle size in the range from 3 to 5 mm is installed in tubes having a typical internal diameter in the range from 35 to 70 mm, typically from 39 to 45 mm. The reaction commences at temperatures of from 40 to 50° C., but increases in the tubes up to 400° C. and more and then rapidly decreases again. In the reaction, carbon monoxide is usually used in excess in order to ensure that the entire chlorine is reacted and largely chlorine-free phosgene is produced, since chlorine can lead to undesirable secondary reactions in the subsequent use of phosgene. The reaction can be carried out under atmospheric pressure, but is generally carried out at a gauge pressure of 200-600 kPa (2-6 bar). In this pressure range, the phosgene formed can be condensed downstream of the reactor using cooling water or other, for example organic, heat transfer media, so that the condenser can be operated economically.

A significant problem in the design of phosgene reactors is the removal of the heat of reaction evolved.

A heat transfer medium flows around the catalyst tubes of the shell-and-tube reactor and carries the heat of reaction which is evolved out of the reactor. It has been found that heat removal is improved when the heat transfer medium flows transversely against the catalyst tubes. For this reason, deflection plates are usually installed in the reactor so as to make transverse flow of the heat transfer medium against the catalyst tubes possible by a meandering flow of the heat transfer medium.

A typical industrial reactor for producing phosgene is described, for example, in the international patent application WO 03/072237 A1 by the applicant.

In reactors on an industrial scale, relatively large differences in the heat transfer coefficients at the interfaces between the catalyst tubes and the heat transfer medium occur over the reactor cross section, for example due to deflection of the heat transfer medium from transverse flow into longitudinal flow but also as a result of pressure drops suffered by the heat transfer medium flowing in the shell space from an opening of one deflection plate to the opposite opening of the following deflection plate and also as a result of pressure drops through gaps between the outer wall of the catalyst tubes and the deflection plates which are unavoidable in terms of manufacturing technology. The heat transfer coefficients of regions with good heat transfer and regions with poor heat transfer within the reactor cross section can certainly differ by a factor of 2. Accordingly, the catalyst tubes are cooled less well in the regions having poor heat transfer. However, since the catalyst tubes are allowed to have a maximum temperature load, which is typically in the range from 160 to 200° C., depending on the material used, because otherwise corrosion of the material increases greatly, the regions having poor heat transfer limit the throughput and thus the capacity of the reactor. For the duplex steel frequently used for the catalyst tubes, the maximum temperature load is typically in the range from about 170 to 180° C.

The throughput through the reactor can be specified via the area load or phosgene load of the reactor, which is defined as the amount of phosgene reacted per unit time (usually reported in kg/s), based on the cross-sectional area of the catalyst, i.e. the sum of the internal cross-sectional areas of the catalyst-filled catalyst tubes (usually reported in $m^2$). To manage the heat of reaction, area loads in the range from 0.5 to 2 kg of phosgene/$m^2$s are therefore usually employed in the prior art. The phosgene area load is thus determined essentially under the assumption of complete conversion of the component employed in a deficiency, i.e., for example, essentially by the chlorine feed in the case of an excess of carbon monoxide.

In the present application, the term "reactor" encompasses all parts of a plant in which the chemical reaction of carbon monoxide and chlorine gas to form phosgene takes place. In this sense, a reactor is frequently a single component which is defined by a reactor vessel. However, a reactor can, for the purposes of the present application, also comprise two or more components having separate reactor vessels which are, for example, arranged one behind the other (in series). In this case, the area load is the total conversion, i.e. the phosgene stream, which leaves the last reactor component, e.g. the last reactor vessel.

In the international patent application WO 2010/076208 A1 by the applicant, the heat transfer coefficients at the interface between the catalyst tubes and the heat transfer medium can be equalized over the reactor cross section by an optimized arrangement of the catalyst tubes, by matching the flow paths of the heat transfer medium to one another in each reactor cross section. Area loads of up to 2.74 kg of phosgene/$m^2$s can be achieved using an optimized heat transfer medium flow profile in such a reactor.

A further problem arising in the design of phosgene reactors is the loss of catalyst material occurring during operation.

As described, for example, in the publication by Mitchell et al. "Selection of carbon catalyst for the industrial manufacture of phosgene", Catal. Sci. Technol., 2012, vol. 2, pp. 2109-2115, there is also a loss of activated carbon during the synthesis of phosgene. This can be caused firstly by oxidation of carbon by traces of oxygen in the chlorine gas fed in. Secondly, a reaction of chlorine with the activated carbon to form volatile carbon tetrachloride ($CCl_4$) can also occur at relatively high temperatures, typically above 300° C. This leads not only to a loss of yield in the process based on the chlorine gas used but also, in particular, to deactivation or burning-away of the catalyst, so that the plant has to be shut down after an appropriate period of operation and the catalyst has to be replaced. In addition, the carbon tetrachloride formed can lead to problems in respect of product quality, for example undesirable coloration, in the subsequent processing of the phosgene, for example in the production of acid chlorides.

Minimization of the $CCl_4$ formation is also desirable in order to prevent accumulation of $CCl_4$ since $CCl_4$ is formed as intermediate boiler in the process and is effectively discharged neither via the low boiler HCl nor via the high boiler isocyanate. Phosgene in turn has a lower boiling point than $CCl_4$, while the solvents customarily used have higher boiling points. $CCl_4$ therefore accumulates in the phosgene circuit and in the solvent circuit, which can lead to costly removal of $CCl_4$.

The present invention therefore addresses the technical problem of providing a process and a reactor for producing phosgene, which largely minimizes the loss of activated carbon, in particular as a result of formation of carbon tetrachloride, without increasing the thermal load on the catalyst tubes.

This technical problem is solved by the process according to the present disclosure.

The invention accordingly provides a process for producing phosgene by gas-phase reaction of carbon monoxide and chlorine in the presence of a catalyst in a reactor which comprises a plurality of parallel catalyst tubes which are filled with the catalyst and around which at least one fluid heat transfer medium flows, where a feed stream of a mixture of a chlorine input stream and a carbon monoxide input stream is fed into the catalyst tubes and is allowed to react to give a phosgene-comprising product gas mixture, wherein the reaction is carried out at an area load of more than 2.75 kg of phosgene/$m^2$s.

Different catalysts, for example SiC catalysts, can be used in the process of the invention. Preference is given to using activated carbon catalysts.

It has surprisingly been found that an increase in the area load to above the range from 0.5 to 2.74 kg/$m^2$s known in the prior art leads to a decrease in the activated carbon loss and in particular to a decrease in the concentration of carbon tetrachloride in the product gas mixture obtained. Carbon tetrachloride can arise both from the reaction of the catalyst activated carbon with chlorine and from the reaction of chlorine with methane comprised in the feed gas. The increase in the area load enables both the time upstream of the plant to be increased, which increases the yield of the process based on the chlorine used, and the concentration of carbon tetrachloride in the phosgene produced to be decreased. The amount of carbon tetrachloride formed from the reaction of the activated carbon with chlorine is preferably less than 125 g per metric tons of phosgene produced, preferably in the range from 0.1 to 125 g of carbon tetrachloride from the reaction of activated carbon with chlorine per metric ton of phosgene produced, more preferably in the range from 10 to 115 g of carbon tetrachloride from the reaction of activated carbon with chlorine per metric ton of phosgene produced, particularly preferably in the range from 10 to 105 g of carbon tetrachloride from the reaction of activated carbon with chlorine per metric ton of phosgene produced, for example less than 120 g, less than 117 g, less than 100 g, less than 80 g or less than 50 g of carbon tetrachloride from the reaction of activated carbon with chlorine per metric ton of phosgene produced.

The recognition documented in, for example, the above-mentioned publication by Mitchell et al. that a loss of activated carbon by formation of carbon tetrachloride occurs at relatively high temperatures initially spoke against an increase in the area load in order to solve the problem. However, it has surprisingly been found that the thermal stress on the catalyst tubes is not increased despite the increased area load. If the premise that the phosgene capacity, i.e. the amount of phosgene produced by the reactor per unit time, and the amount of catalyst used for this purpose should not be changed in comparison with the industrial processes of the prior art in implementation of the process of the invention, the ratio of the volume flow of the reactants to the volume of the catalyst, i.e. the space velocity or GHSV (gas hourly space velocity), also remains unchanged. When the area load is increased, an unchanged GHSV leads to an increased flow velocity of the reactants used, which in turn leads to an improvement in the specific heat transfer and thus reduces the thermal stress on the catalyst, especially in the center of the catalyst tubes.

The area load in the process of the invention is preferably in the range from 3 kg of phosgene/$m^2$s to 9 kg of phosgene/$m^2$s, preferably in the range from 4 to 6 kg/$m^2$s, more preferably in the range from 4.1 to 6 kg/$m^2$s, more preferably in the range from 4.3 to 5.9 kg/$m^2$s and particularly preferably in the range from 4.5 to 5.8 kg/$m^2$s, for example in the range from 4.2 to 6 kg/$m^2$s.

The feed stream in the process of the invention preferably has a stoichiometric excess of carbon monoxide to chlorine of from 0.1 to 50 mol %, so that virtually complete conversion of chlorine is ensured. If a fluctuating chlorine concentration has to be expected in the chlorine input stream, a higher carbon monoxide excess will tend to be chosen, but the excess is generally for cost reasons kept as small as possible as long as complete conversion of chlorine is still ensured.

The feed stream is preferably fed in with an absolute pressure in the range from 50 to 2000 kPa (from 0.5 to 20 bar). The feed stream is particularly preferably fed in with a super atmospheric pressure, for example at an absolute pressure of from 300 to 700 kPa (from 3 to 7 bar) (absolute). The higher the pressure of the resulting reaction mixture at the outlet of the reaction, the higher the temperatures at which the phosgene comprised in the reaction mixture can be condensed. The pressure of the reaction mixture at the outlet from the reactor is preferably sufficiently high for the phosgene to be able to be at least partly condensed using cooling water.

In an embodiment of the invention, the reactor is divided in the longitudinal direction of the catalyst tubes into at least two cooling zones which are, for example, separated from one another by intermediate plates. Different heat transfer media can be used in the various cooling zones and the selection of these can be matched to the thermal conditions in the respective cooling zones. Since, however, complete sealing of the catalyst tube feed-throughs in the intermediate plates is difficult, so that leaks usually have to be expected in practice, the same heat transfer medium is preferably used in the various cooling zones. In this case, evaporative cooling can then be carried out, for example, in a cooling zone having particularly high evolution of heat, while liquid cooling is carried out in another cooling zone. In the case of evaporative cooling, preference is given to not providing any deflection plates or specifically designed deflection plates at which backup of ascending gas bubbles is prevented.

As fluid heat transfer medium, it is possible to use various materials and substance mixtures which, for example, owing to their heat capacity or owing to their enthalpy of vaporization are suitable for removing the heat of reaction. A liquid heat transfer medium such as water, dibenzyltoluene (Marlotherm) or monochlorobenzene is typically used.

The increase in the area load provided according to the invention can be achieved in existing reactors by appropriate adaptation of the operating parameters, in particular an increase in the volume flow of the reactants. Newly designed reactors can, however, already be designed structurally to optimized operation at the area load provided according to the invention.

The invention therefore also provides a reactor for producing phosgene by gas-phase reaction of carbon monoxide and chlorine in the presence of a catalyst, in particular in the presence of an activated carbon catalyst, which comprises a plurality of parallel catalyst tubes which are filled with the catalyst and are at both ends thereof welded in each case to a tube plate, with introduction of the starting materials at the upper end of the catalyst tubes and discharge of the gaseous reaction mixture at the lower end of the catalyst tubes, in each case via a cap, and with input and discharge devices for a liquid heat transfer medium into/from the shell space between the catalyst tubes, wherein the plurality of parallel catalyst tubes in the reactor of the invention are designed for an area load of more than 2.75 kg of phosgene per square meter of internal cross-sectional area of the catalyst tubes per second.

The catalyst tubes of the reactor are preferably designed for an area load in the range from 3 kg of phosgene/$m^2$s to 9 kg of phosgene/$m^2$s, preferably in the range from 4 to 6 kg/$m^2$s, more preferably in the range from 4.1 to 6 kg/$m^2$s, more preferably in the range from 4.3 to 5.9 kg/$m^2$s and particularly preferably in the range from 4.5 to 5.8 kg/$m^2$s, for example in the range from 4.2 to 6 kg/$m^2$s.

The design according to the invention of the reactor limits the amount of carbon tetrachloride formed from the reaction of the activated carbon with chlorine in the reaction to form phosgene, preferably to less than 125 g per metric ton of phosgene produced. The formation of carbon tetrachloride is preferably limited to the range from 0.1 to 125 g of carbon tetrachloride from the reaction of activated carbon with chlorine per metric ton of phosgene produced, more preferably limited to the range from 10 to 115 g of carbon tetrachloride from the reaction of activated carbon with chlorine per metric ton of phosgene produced, particularly preferably limited to the range from 10 to 105 g of carbon tetrachloride from the reaction of activated carbon with chlorine per metric ton of phosgene produced, for example limited to less than 120 g, less than 117 g, less than 100 g, less than 80 g or less than 50 g of carbon tetrachloride from the reaction of activated carbon with chlorine per metric ton of phosgene produced.

Proceeding from a typical industrial reactor of the prior art which is operated at a particular area load, the same phosgene capacity and the same GHSV, for example as in the reactor of the prior art can be assumed for the design of a reactor for carrying out the process of the invention. This assumption is also relevant in practice when, for example, an existing reactor is to be replaced by a reactor according to the invention without the overall process being influenced.

In a variant of the invention, the increase proposed according to the invention in the area load can be achieved by reducing the number of catalyst tubes in the reactor with a corresponding increase in the length of the catalyst tubes. For example, when the number of catalyst tubes is halved while maintaining the same tube diameter, both the area load and the tube length are doubled. Taking into account the teaching according to the invention, the corresponding reactors therefore become slimmer, i.e. they have a smaller diameter at a comparable GHSV, which is advantageous both in respect of manufacture and also for cooling of the catalyst tubes. Owing to the higher gas velocity and greater bed length, the pressure drop becomes higher in the catalyst tubes but this at the same time leads to better distribution of the feed stream over all the catalyst tubes.

In a further variant of the invention, the area load can be realized compared to known reactors at the same phosgene capacity and amount of catalyst at an unchanged number of tubes by a decrease in the diameters of the individual catalyst tubes and again a corresponding lengthening of the catalyst tubes.

Of course, combinations of the two measures are also conceivable, i.e. decreasing the number of tubes and also making the diameter of the individual tubes smaller.

In the working example of the abovementioned international patent application WO 2010/076208 A1, the production of phosgene is carried out at an area load of 2.74 kg/$m^2$s in a reactor having 5210 catalyst tubes having an internal tube diameter D of in each case 39.3 mm and a tube length L filled with catalyst (bed height) of in each case 3800 mm.

The catalyst tubes of the reactor of the invention can have a length L in the range from 1.5 to 12 m, preferably from 2.5 to 8 m. Particular preference is given to reactor tube lengths in the range from 6 to 6.5 m. About 25 cm at the beginning and end of each catalyst tube are usually free of catalyst since the removal of heat in this region is unsatisfactory because of the installation situation of the tubes.

On the other hand, a reactor according to the invention can achieve the desired increase in the area load at an unchanged number of catalyst tubes by, for example, a reduction in the internal tube diameter with a simultaneous increase in the tube length.

However, catalyst tubes having comparable internal diameters to those in the prior art can also be used in the reactor of the invention. The desired increase in the area load can then be achieved, for example, by reducing the number of catalyst tubes. In a further embodiment, the reactor of the invention is therefore equipped with from 1000 to 10000 catalyst tubes.

The reactor of the invention can be cylindrical with an internal diameter of preferably from 0.3 to 6 m, more preferably from 2 to 5 m, in particular from 2.5 to 4 m.

In the reactor, there is a bundle, i.e. a plurality, of catalyst tubes arranged parallel to one another in the longitudinal direction of the reactor.

The catalyst tubes are made of a corrosion-resistant material, for example stainless steel, preferably duplex steel 1.4462, stainless steel 1.4571 or stainless steel 1.4541 or else of nickel-based alloys or of nickel. The tube plates or else the entire reactor are also preferably made of the abovementioned materials, in particular of duplex steel or stainless steel. However, the reactor shell and reactor plates can also be made of cheaper metals and metal alloys, for example of black steel. Components which come into contact with reactants can then be clad with a protective layer composed of higher-value materials.

Each catalyst tube preferably has a wall thickness in the range from 2.0 to 4.0 mm, in particular from 2.5 to 3.0 mm, and an internal tube diameter in the range from 20 to 90 mm, preferably in the range from 30 to 50 mm.

The contact tubes are fastened, preferably welded, at both ends into tube plates in a fluid-tight manner. The tube plates likewise consist of a corrosion-resistant material, preferably stainless steel, in particular duplex steel, particularly preferably the same material as the catalyst tubes. Sealing into the tube plates is preferably effected by welding. For example, at least two layers of welding seams can be provided per tube and are offset at an angle, for example offset by 180°, so that beginning and end of the respective layers do not coincide.

Both reactor ends are bounded on the outside by caps. The reaction mixture is fed into the catalyst tubes via one cap, and the product stream is taken off via the cap at the other end of the reactor.

Gas distributors for equalizing the gas flow, preferably in the form of a plate, in particular a perforated plate, are preferably arranged in the cap in which the reaction mixture is fed in.

Deflection plates are arranged perpendicularly to the longitudinal direction of the reactor in the intermediate space between the catalyst tubes. The deflection plates can, for example, have such a configuration that successive deflection plates have openings having the shape of a segment of a circle and located opposite one another to the interior wall of the reactor in order to ensure a meandering course of the fluid heat transfer medium. In another embodiment, the bundle of tubes can also be divided into two bundles, with a deflection plate then having two openings having the shape of a segment of a circle and located opposite one another, with the directly following deflection plate having a through-opening in a central region of the reactor. The deflection plates bring about deflection of the heat transfer medium circulating in the interior of the reactor, in the intermediate space between the catalyst tubes, so that the heat transfer medium flows transversely onto the catalyst tubes, which improves the removal of heat. The number of deflection plates is preferably from about 6 to 35. The deflection plates are preferably arranged equidistantly from one another, but the lowermost deflection plate and the uppermost deflection plate is particularly preferably further removed from the tube plate than the distance between two successive deflection plates, preferably by a factor of about 1.5. In the region of the through-openings, the reactor is without tubes, i.e. it is essentially free of catalyst tubes. In one embodiment, individual catalyst tubes can be arranged in the through-openings of the deflection regions. In a further embodiment, the through-openings are completely free of catalyst tubes. Preference is given to all deflection plates leaving the same number of through-openings free. The area of each through-opening is preferably from 5 to 20%, in particular from 8 to 14%, of the reactor cross section.

The deflection plates are preferably not arranged in a sealed manner around the catalyst tubes and permit a leakage flow of up to 40% by volume of the total flow of the heat transfer medium. For this purpose, gaps in the range from 0.1 to 0.6 mm, preferably from 0.2 to 0.4 mm, are provided between the catalyst tubes and deflection plates. It is advantageous to configure the deflection plates so as to be liquid-tight with the exception of the regions of the through-openings to the interior wall of the reactor, so that no additional leakage flow occurs there.

The deflection plates can be made of a corrosion-resistant material, preferably stainless steel, in particular duplex steel, preferably in a thickness of from 8 to 30 mm, preferably from 10 to 20 mm. However, since deflection plates do not come into contact with reaction participants and the catalyst tubes are usually passed with some play through the openings of the deflection plates, the deflection plates can also be made of cheaper materials such as black steel.

In a preferred embodiment, the shell space of the reactor of the invention is divided into at least two cooling zones separated by intermediate plates. The intermediate plates are preferably made of a higher-value material since the openings in the intermediate plate through which the catalyst tubes are passed should form a very tight seal against the outer shell of the catalyst tubes by rolling-on.

The catalyst tubes are filled with a solid-state catalyst, preferably activated carbon. The catalyst bed in the catalyst tubes preferably has a gap volume of from 0.33 to 0.6, in particular from 0.33 to 0.45. The gap volume relates to the catalyst bed in which the solid-state catalyst is assumed as solid body. The porosity of the catalyst bodies themselves, which can, for example, be 50%, is not taken into account.

The invention will be illustrated in more detail below with the aid of schematic drawings and with the aid of a working example:

BRIEF DESCRIPTION OF DRAWINGS

The drawings show

FIG. 1 shows a typical phosgene reactor 1 as is described in more detail, for example, in the international patent application WO 03/072273 by the applicant. The reactor 1 shown in longitudinal section in FIG. 1 has a bundle of catalyst tubes 2 which are fastened parallel to one another in the longitudinal direction of the reactor 1 into upper and lower tube plates 3 in a sealed manner. Caps 4 in which gas distributors 12 are arranged are provided at the two ends of the reactor. In the intermediate space 5 between the catalyst tubes 2, through which space a liquid heat transfer medium flows, there are deflection plates 6 which are arranged perpendicularly to the longitudinal direction and alternately leave through-openings 7 opposite one another free at the interior wall of the reactor. In the region of the through-openings 7, the reactor 1 is without tubes since only unsatisfactory cooling of the catalyst tubes would be possible in these regions due to the transition of the coolant flow from a transverse flow to a longitudinal flow. Ports or part-ring channels 11 are provided for the introduction and discharge of the heat transfer medium. In the example depicted, a compensator 10 is additionally provided on the reactor shell to equalize thermal stresses.

FIG. 2 schematically shows a longitudinal section of a reactor according to the invention which has been obtained by modification of the reactor of FIG. 1 in order to generate a greater area load (phosgene load) at an unchanged phosgene capacity and an unchanged GHSV. Elements which are identical to elements of the reactor of FIG. 1 have been provided with the same reference numerals increased by 100. The reactor 101 of the invention again has catalyst tubes 102 which are arranged parallel to one another in the longitudinal direction of the reactor and are fastened so as to form a seal in an upper tube plate 103a and a lower tube plate 103b. The feed gas mixture is introduced via an inlet port 113 into an upper cap 104a and is distributed over the catalyst tubes 102 with the aid of a gas distributor 112. In the example depicted, the catalyst tubes 102 consist of duplex steel 1.4462 and have a length L which corresponds essentially to the bed height of the catalyst present in the catalyst tubes. The catalyst tubes each have an internal diameter D of 39.3 mm and are filled with cylindrical activated carbon catalyst particles having a diameter of 4 mm and a length of 5 mm. After flowing through the catalyst tubes, the reaction mixture is discharged via the cap 104b located at the lower end and an outlet port 114. In countercurrent to the flow of the reaction gases, a fluid heat transfer medium is introduced at the lower end of the reactor 102 via a port 111a and is conducted through the reactor in a meandering flow by the deflection plates 106 which are arranged perpendicularly to the longitudinal direction of the reactor and alternately leave through-openings 107 free in the peripheral region of the reactor and exits again through an exit port 111b.

Figure 1:
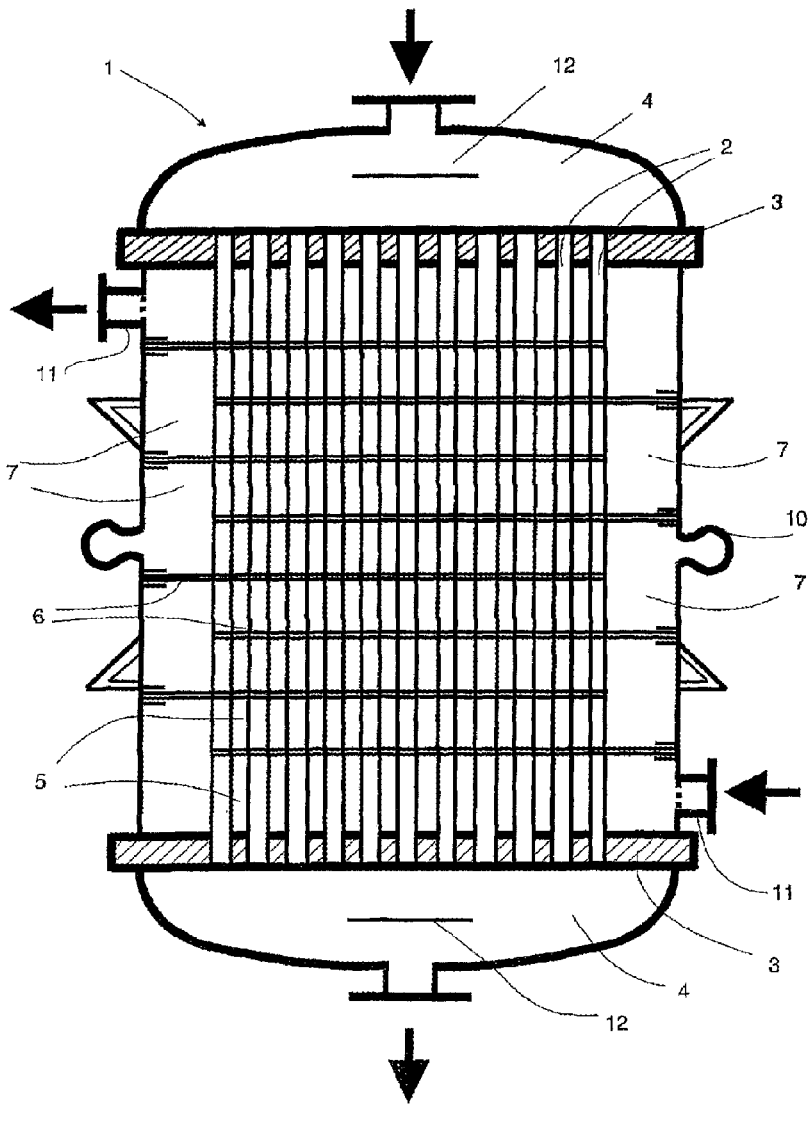
FIG. 1 a schematic depiction of a reactor of the prior art in longitudinal section.
Figure 2:
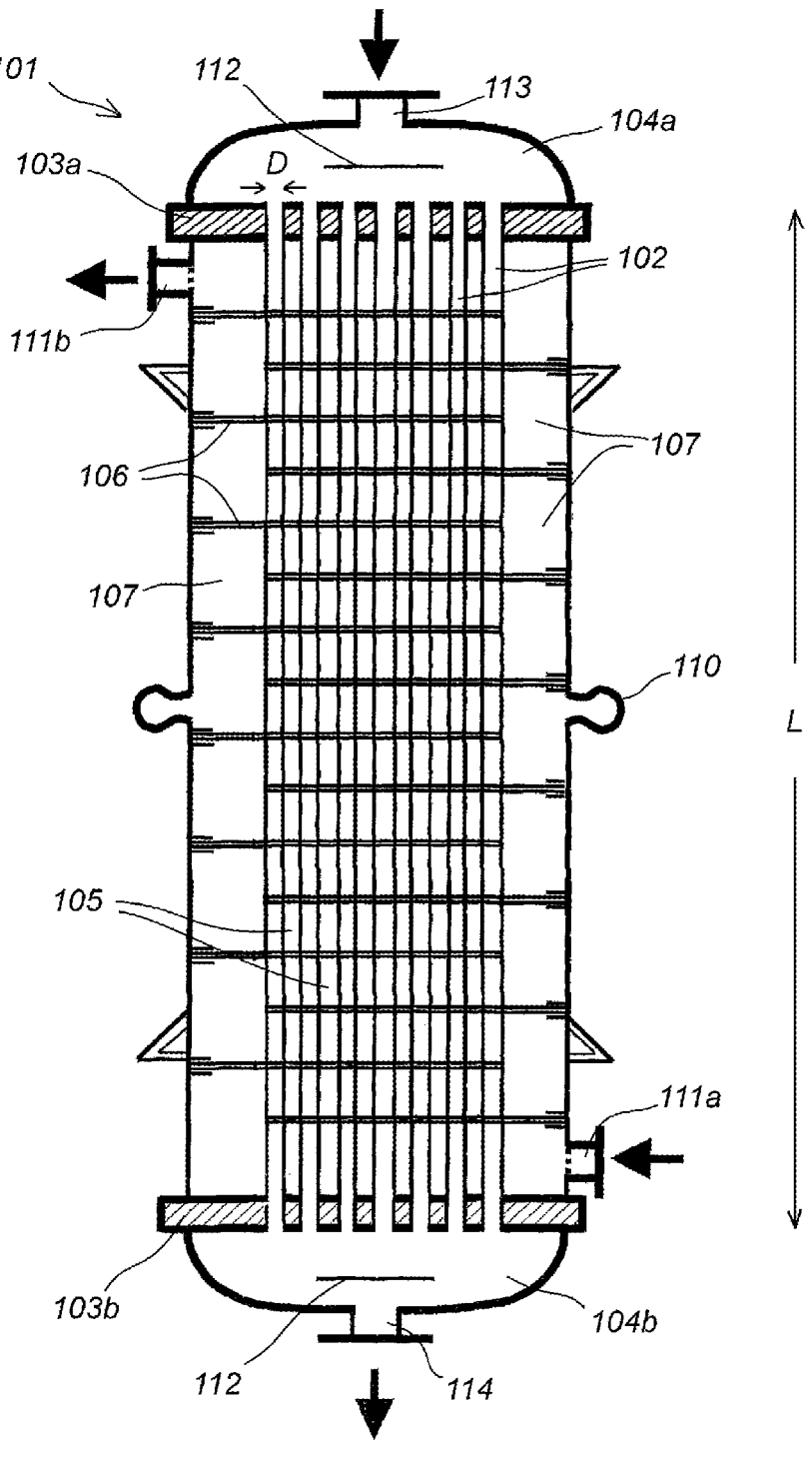
FIG. 2 an inventive reactor modified for operation at an increased area load, proceeding from the reactor of FIG. 1.

As can be seen by comparison of FIGS. 1 and 2, the number of catalyst tubes 102 in the embodiment according to the invention is decreased compared to the embodiment of the prior art, while the catalyst-filled length L of the catalyst tubes has been increased by the same factor, so that the total amount of catalyst in the reactors 1 and 101 is the same. In the example depicted, the area load (phosgene load) is, at an unchanged GHSV, increased by the same factor as the catalyst-filled length of the catalyst tubes in the comparison of the reactors of FIGS. 1 and 2.

Figure 3:
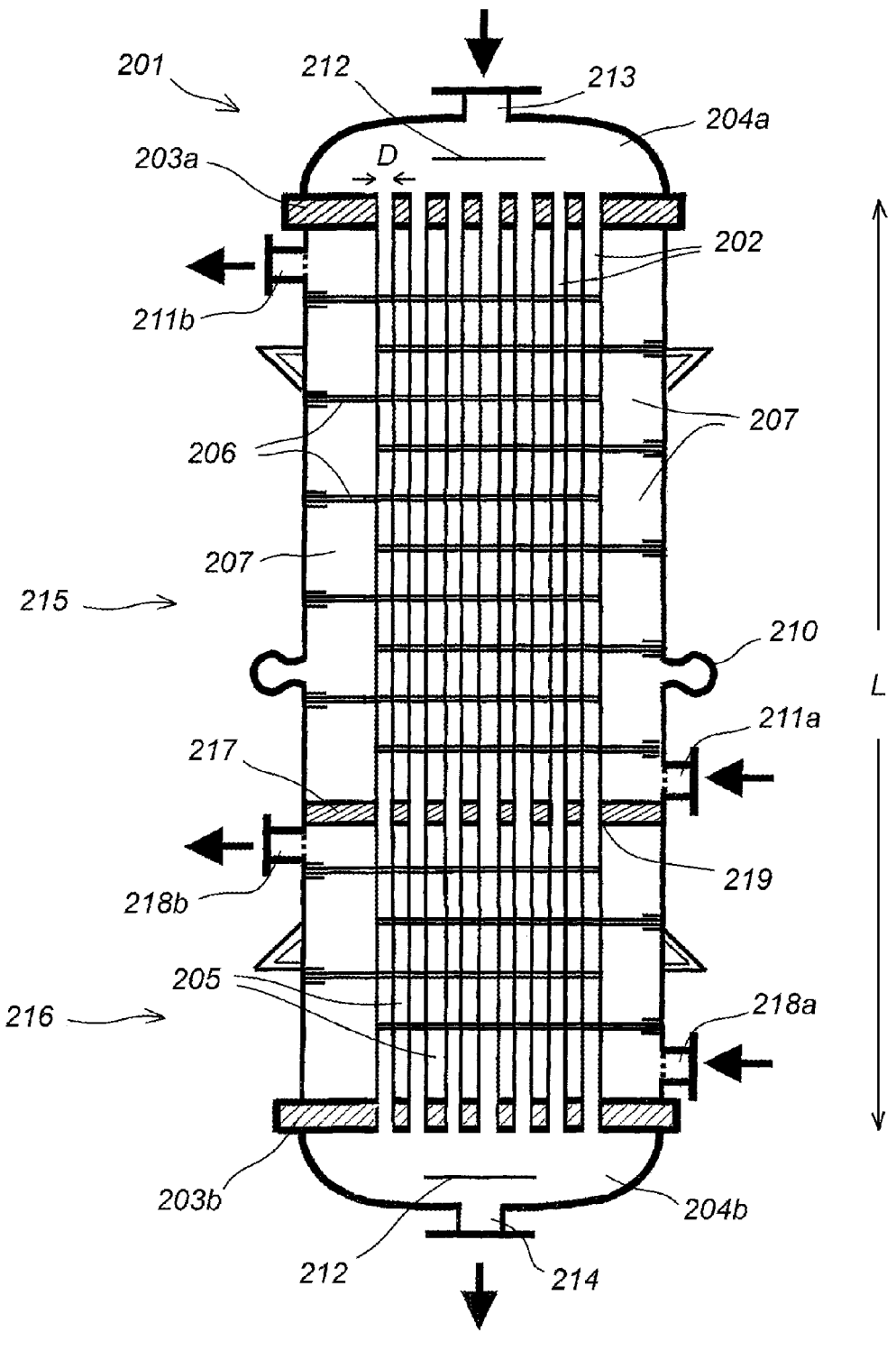
FIG. 3 a variant of the reactor of FIG. 2 with two cooling zones.

FIG. 3 schematically shows a longitudinal section of a variant 201 of the reactor 101 of FIG. 2. Elements which are identical to elements of the reactor of FIG. 2 or perform a corresponding function have been denoted by the same reference numerals increased by 100 and are not explained in more detail in the following. In contrast to the reactor 101 of FIG. 2, the reactor 201 of FIG. 3 has two separate cooling zones 215, 216 which are separated from one another by an intermediate plate 217. At the lower end of the first cooling zone 215, a first fluid heat transfer medium is introduced in countercurrent to the flow of the reaction gases via a port 111a, is conducted in a meandering flow through the reactor by the deflection plates 206 which are arranged perpendicularly to the longitudinal direction of the reactor and each leave alternately through-openings 207 free in the peripheral region of the reactor and exits again from the first cooling zone 215 via an exit port 211b. A corresponding coolant flow is provided in the second cooling zone 216. Here, a second fluid heat transfer medium enters the second cooling zone via a port 218a, is again conveyed in countercurrent in a meandering fashion through the cooling zone and exits again from the second cooling zone 216 at a port 218b. The cooling zones 215 and 216 can be cooled using different heat transfer media. However, the same heat transfer medium is preferably used in neighboring cooling zones since the openings 219 in the intermediate plate 217 for passage of the catalyst tubes 202 can be sealed completely only with great difficulty. However, different cooling schemes can be used even when using the same heat transfer medium. For example, it is possible to use a liquid coolant which removes heat by means of evaporative cooling in the first cooling zone 215, while removal of heat occurs by means of pure liquid cooling in the second cooling zone 216.

Working Example

Activated carbon catalyst of the type Donaucarbon ED47 in the form of extrudates having a diameter of about 4 mm is introduced to a bed height of 2 m into a reaction tube having an internal diameter of 39.3 mm. Gaseous CO is fed in a stoichiometric excess of 10% together with gaseous chlorine into the reaction tube. Cooling is effected by a liquid coolant (chlorobenzene) having a temperature of 80° C.

The plant was operated at various area loads in the range from 1.7 to 3 kg of phosgene per $m^2$ of tube area and second, with the fill height/bed height being increased proportionally to the load, so that space velocity/GHSV remain the same.

A reactor model (described in Mitchell et al., "Selection of carbon catalysts for the industrial manufacture of phosgene", Catal. Sci. Technol., 2012, 2, 2109-2115) was fitted to the operating data of the plant. From the model and gas-chromatographically determined $CCl_4$ formation kinetics, data for the $CCl_4$ concentration at the outlet were then determined for different area loads over a load range from 1.7 to 5.7 kg of phosgene per $m^2$ of tube area and second.

The results are summarized in table 1 below.

It can be seen from the values that an increase in the area load leads to a decrease in the $CCl_4$ concentration and a corresponding reduction in the specific $CCl_4$ formation per metric ton of phosgene produced.

TABLE 1

| Area load [kg/s/m²] | Bed height [m] | GHSV [Nm³/h/V$_{Cat}$] | CCl₄ concentration [ppm] | Specific CCl₄ formation [g CCl₄/t Phosgene] |
|---|---|---|---|---|
| 1.7 | 2 | 738 | 140.9 | 239.5 |
| 2.7 | 3.2 | 738 | 75.2 | 128.2 |
| 3.7 | 4.4 | 738 | 53.6 | 91.7 |
| 4.7 | 5.5 | 738 | 37.7 | 64.5 |
| 5.7 | 6.7 | 738 | 22.8 | 39 |

The invention claimed is:

1. A process for producing phosgene by gas-phase reaction of carbon monoxide and chlorine in the presence of a catalyst in a reactor which comprises a plurality of parallel catalyst tubes which are filled with the catalyst and around which at least one fluid heat transfer medium flows, where a feed stream of a mixture of a chlorine input stream and a carbon monoxide input stream is fed into the catalyst tubes and is allowed to react to give a phosgene-comprising product gas mixture, wherein the reaction is carried out at an area load of from 3.7 to 9 kg of phosgene/m²s, and wherein an amount of carbon tetrachloride formed from a reaction of activated carbon with chlorine is less than 125 g per metric ton of phosgene produced.

2. The process according to claim 1, wherein the catalyst comprises an activated carbon catalyst.

3. The process according to claim 1, wherein the reaction is carried out at an area load of from 4.1 to 9 kg of phosgene/m²s.

4. The process according to claim 3, wherein the reaction is carried out at an area load of from 4.1 to 6 kg of phosgene/m²s.

5. The process according to claim 1, wherein the feed stream has a stoichiometric excess of carbon monoxide over chlorine of from 0.1 to 50 mol %.

6. The process according to claim 1, wherein the feed stream is introduced with an absolute pressure in the range from 50 to 2000 kPa.

7. The process according to claim 1, wherein the at least one fluid heat transfer medium flows around the catalyst tubes in separate cooling zones.

8. The process according to claim 1, wherein the at least one fluid heat transfer medium is a liquid heat transfer medium.

\* \* \* \* \*